Sept. 18, 1956
R. J. ROCKWELL
2,763,732
HIGH FIDELITY AMPLIFIER
Filed July 6, 1953
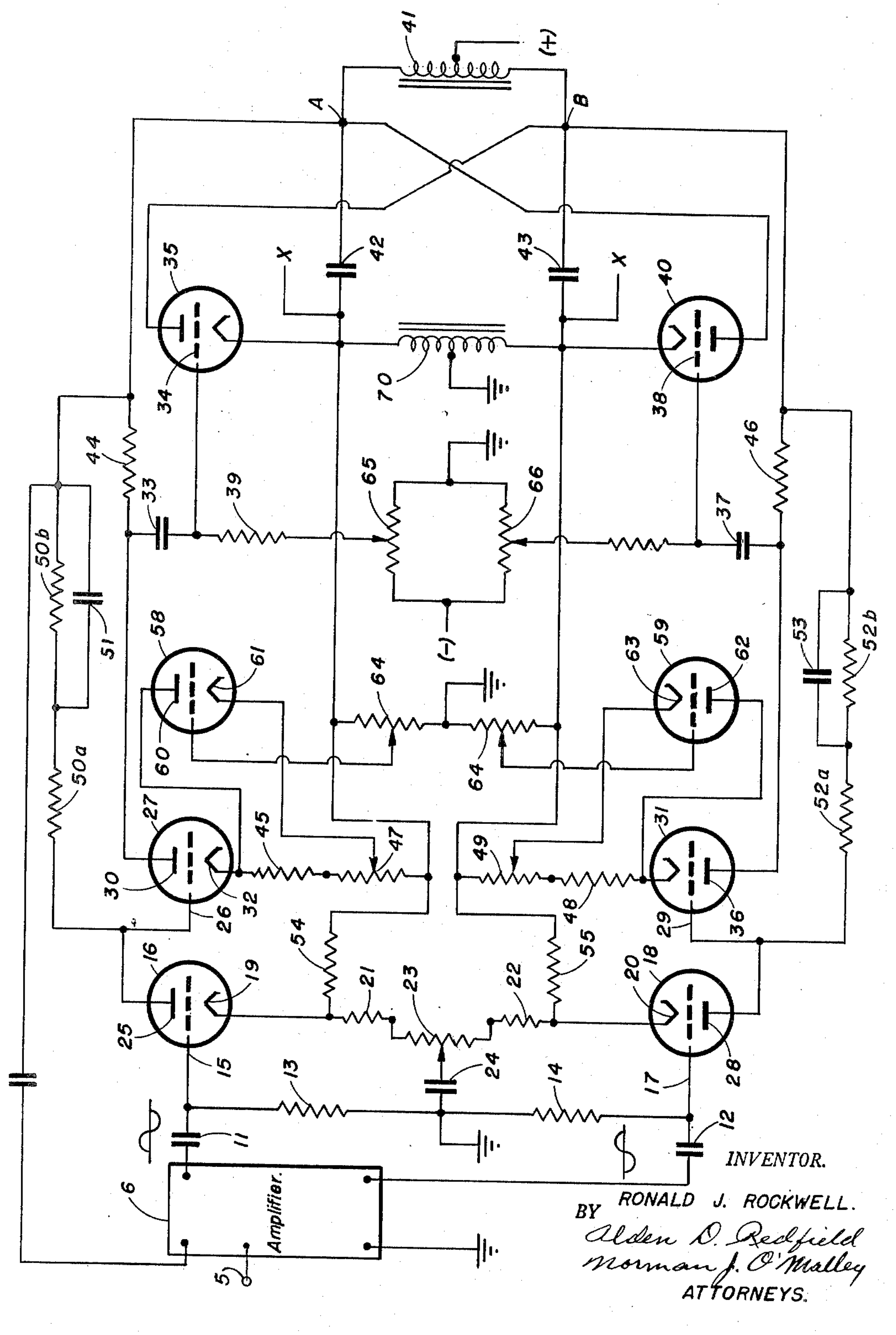
INVENTOR.
BY RONALD J. ROCKWELL.
Alden D. Redfield
Norman J. O'Malley
ATTORNEYS.

United States Patent Office 2,763,732

Patented Sept. 18, 1956

2,763,732

HIGH FIDELITY AMPLIFIER

Ronald J. Rockwell, Cincinnati, Ohio, assignor to Crosley Broadcasting Corporation, Cincinnati, Ohio, a corporation of Ohio Application July 6, 1953, Serial No. 366,117

7 Claims. (Cl. 179—171)

This invention relates generally to amplifier circuits and more specifically to high fidelity amplifiers of the type especially suitable for use as a Class B modulator.

The bandwidth and fidelity of conventional amplifiers is inherently limited by signal distortions arising in the output transformer. This problem has been dealt with in part in the circuit disclosed in my U. S. Patent 2,446,025, which issued on July 27, 1948, wherein I disclosed a basic single-ended transformerless amplifier circuit. The problem was further dealt with in my application, Serial No. 119,401, filed October 4, 1949, which issued on August 11, 1953 as United States Patent 2,648,727, wherein I disclosed a double-ended high fidelity transformerless amplifier now known as the cathanode amplifier.

Though the cathanode amplifier solved many of the problems formerly encountered in conventional amplifiers with relation to bandwidth and fidelity, it was found that conventional driver tube circuitry did not take full advantage of the transformerless output of the cathanode type amplifier. Therefore, it is an object of this invention to provide a very high fidelity amplifier of the cathanode output type.

It is a further object of this invention to provide a very high fidelity amplifier circuit using feedback networks to improve fidelity and also to reduce the size of the driver tubes.

It is a still further object of this invention to provide a very high fidelity amplifier in a relatively small number of stages, which is especially suitable for use as a Class B modulator.

It is also a basic object of this invention to provide a very high fidelity amplifier of the double-ended type, using a minimum number of stages and relatively small driver tubes.

Briefly, my invention comprises a four-stage amplifier circuit having a single-ended input and a cathanode type of output stage. The circuit is characterized by the use of feedback voltages to both the cathode and anode circuits of the driver stages and a single feedback lead from the double-ended output to the single-ended input. In other words, as shown in the preferred embodiment, the output circuit is degeneratively coupled to both the anode and cathode of the input driver stage and regeneratively coupled to both the anode and cathode of the second driver stage. Direct coupling is used between the first and second driver stages with capacitive coupling between the second stage and the output or cathanode stage.

For a better understanding of the present invention, together with other and further objects, advantages and capabilities thereof, reference is made to the following disclosure and appended claims in connection with the accompanying drawing in which:

The single figure is a circuit diagram of a specific embodiment of my invention.

In the preferred embodiment, as shown, a single-ended input circuit comprising terminal 5 and phase-inverting amplifier 6 is coupled by capacitors 11 and 12 and grid-leak resistors 13 and 14 to the grid 15 of Class A operated tube 16 and the grid 17 of Class A operated tube 18, respectively. Cathode 19 of tube 16 and cathode 20 of tube 18 are A.-C. coupled to ground through a balancing network comprising resistors 21 and 22, potentiometer 23 and capacitor 24.

The anode 25 of tube 16 is directly coupled to grid 26 of tube 27, which comprises one-half of the second driver stage. Symmetrically, anode 28 of tube 18 is directly coupled to the grid 29 of tube 31, which comprises the other half of the second driver stage. Anode 30 of driver tube 27 is coupled through capacitor 33 to the grid 34 of output tube 35. As will be more exhaustively explained, output tube 35 comprises one-half of the cathanode transformerless output stage. Symmetrically, anode 36 of tube 31 is coupled through capacitor 37 to the grid 38 of tube 40, which comprises the other half of the cathanode output stage. All of the tubes are supplied from a common source of anode potential, not shown, through coil 41, across which an output may be taken either directly or, as shown, through coupling capacitors 42 and 43.

The side of coil 41 which is connected to the anode of tube 40, i. e., terminal A, is coupled regeneratively to both the plate and cathode of driver tube 27 through anode resistor 44 and its cathode resistors 45 and 47, respectively. Symmetrically, terminal B of coil 41, which is connected to the anode of output tube 35, is regeneratively coupled to both the anode and cathode of driver tube 31 through anode resistor 46 and cathode resistors 48 and 49, respectively. The anode 25 of driver tube 16 is degeneratively coupled to terminal A of output coil 41 through an anode impedance comprising resistors 50*a* and 50*b* and capacitor 51. Symmetrically, terminal B of coil 41 is degeneratively coupled to anode 28 of input tube 18 through a network comprising resistors 52*a* and 52*b* and capacitor 53. Resistor 54 degeneratively couples the cathode 19 of input tube 16 to terminal A of output coil 41. Similarly, resistor 55 degeneratively couples the cathode 20 of input tube 18 to terminal B of the output coil 41.

As will be more exhaustively considered, the nonsymmetrical nature of the useful signal fed through coupling capacitors 33 and 37 makes it necessary to provide compensating tubes 58 and 59 for maintaining the desired A.-C. signal axis. Anode 60 of compensating tube 58 is coupled directly to cathode 32 of driver tube 27, and cathode 61 is coupled to a variable tap on cathode resistor 47. Symmetrically, anode 62 of the other compensating tube 59 is coupled directly to the cathode of driver tube 31, while the cathode 63 is coupled to a variable tap on cathode resistor 49. Control voltage is applied to the grids of the compensating tubes from variable taps on a resistor 64, which is connected across the output of the amplifier and center-tapped to ground.

Bias for output tubes 35 and 40 is supplied from variable taps on resistors 65 and 66 which are connected to a source of bias potential, not shown. Coil 70, which is coupled across the output and between the cathodes of output tubes 35 and 40, may or may not be wound on a common core with coil 41. As is brought out in my U. S. Patent No. 2,648,727, it is possible to reduce the siez of coupling capacitors 42 and 43 by utilizing a tight coupling between coils 41 and 70, although tight coupling may reduce bandwidth.

Now, considering operation of the preferred embodiment, as shown in the single figure, let it be assumed that a push-pull signal of the wave form shown at the input of tubes 16 and 18 is being fed to these tubes. The positive signal excursion on grid 15 of tube 16 increases the anode current through the anode impedance comprising resistors 50*a*, 50*b* and capacitor 51. The resulting drop in potential on anode 25 is impressed on the input circuit, or grid 26 of driver tube 27. The resulting signal voltage excursion on grid 26 is negative, decreasing anode current flow through tube 27 and resistor 44 and raising the potential on anode 30. The resulting positive signal excursion on anode 30 is fed through coupling capacitor 33 across grid-leak resistor 39 to the grid circuit of cathanode output tube 35, causing increased anode current flow in tube 35 and a resulting drop in potential at terminal B of coil 41. This increased anode current flow also passes through coil 70, raising the potential on the cathode of tube 35 by normal cathode-follower action.

During this period grid 17 of input tube 18 is driven negative, decreasing the anode current flow through the tube and the network comprising impedances 52*a*, 52*b* and 53. This results in a positive signal excursion on grid 29 of driver tube 31. Both driver tube 31 and driver tube 27 operate essentially at zero bias, statically. In other words, in the absence of signal, grid 29 of driver tube 31 is substantially at the same voltage as its cathode. Likewise, grid 26, in the absence of signal voltage, is essentially at the same potential as the cathode 32 of driver tube 27.

Thus, a strong positive signal excursion on grid 29 of driver tube 31 produces a distorted signal on the anode 36, i. e., the peak of the output signal is compressed, due to anode current saturation. The signal distortion in question is not seen across the amplifier output stage, however, because, as will be more exhaustively explained, normally only half of the amplifier output stage is amplifying useful signals at any given instant, and the other half of the output stage is cut off. That is, one output tube amplifies during the first half-cycle of the signal and the other output tube amplifies during the second half-cycle of the signal. Second driver tube distortion only occurs in a channel or amplifier side whose output tube is cut off. Thus, this distortion is never seen across the output of the amplifier.

In order to make certain that output tube 40 is cut off during the period when output tube 35 is amplifying useful signals, and in order to make certain that output tube 35 is cut off when tube 40 is amplifying useful signals, it is necessary to apply strong negative cut-off signal excursions. The compressed signal which results from driving a second stage driver tube into anode current saturation does not perform this function satisfactorily, and compensating tubes 58 and 59 are necessary.

Compensating tubes 58 and 59 also solve a second problem brought about by the asymmetrical nature of the resulting signals fed to the cathanode output stage through coupling capacitors 33 and 37. As is well known to those skilled in the art, coupling capacitors block the D.-C. potential of a signal and pass only the A.-C. component. This results from the fact that coupling capacitors, such as capacitor 33, pick up a charge which is equal to the average value of the applied voltage. Thus, when the applied voltage reaches this average value, the coupling capacitor neither charges nor discharges, and no current flows through the grid-leak resistor or load connected on the other side of the capacitor. The zero axis of the signal voltage applied across the grid-leak resistor, as a result, corresponds to the average value of the applied voltage.

As has been stated, the control grids of tubes 27 and 31 in the second driver stage are statically biased at zero volts or at cathode voltage, and each tube passes negative half-cycles linearly but tends to suppress strong positive half-cycles and feed an asymmetrical signal to the input of the cathanode stage. The zero axis or average value of this uncompensated asymmetrical signal as impressed on the input of the cathanode stage depends upon the amount of suppression in the second driver stage, and the greater the amount of signal peak suppressed the greater the shift in the zero axis. For example, as one side of the signal is suppressed the average or zero axis moves away from the suppressed peak closer to the peak of the undistorted half-cycle. Very weak signals which may be passed by the second driver stage without distortion maintain the desired A.-C. axis; however, signals having high peaks swing the second driver stage tubes into anode current saturation, and the desired zero axis of the resulting asymmetrical output signal of the stage is shifted by the charging of the coupling capacitors.

Thus, in the absence of compensation the plate current excursions in the two cathanode output tubes do not produce a composite plate current excursion which crosses the zero axis linearly. The output tubes cut off too soon, and the resulting slope of the output signal is distorted in the vicinity of the zero axis.

The compensating tubes also can be adjusted to compensate for a third source of distortion brought about by poor regulation in the anode power supply. It is virtually impossible and economically unfeasible to supply an anode power source having a high kilowatt capacity without some voltage regulation, i. e., some voltage "sag," when signal is applied. This change in anode potential changes the operating characteristics of the output tubes under load, and thus it is necessary to statically bias these tubes at the level required for a distortion-free signal when the tube is operating on the loaded characteristic curve. In the absence of other compensation, this means that the tube must be underbiased, i. e., biased farther away from cut-off than would be necessary in the absence of anode voltage sag. This means higher static or idle anode current. For example, in a 50 kilowatt transmitter where approximately 35 kilowatts of audio power had to be handled, this additional idle power dissipation amounted to approximately 15,000 watts. When compensating tubes 58 and 59 are included in the circuit this power loss may be reduced to approximately 10% of this value because these tubes can be adjusted to allow the cathanode tubes to operate very near cut-off, and thus at a low static power dissipation level.

When signal is applied to the amplifier and the anode supply voltage sags or drops, it is necessary to raise the average voltage level of the signal being amplified. In the uncompensated circuit this was done by decreasing the bias on the tube, moving the D.-C. grid potential more positive. This tends to shift the operating point of the tube to a higher level on its characteristic curve and thus lifts the positive input signal peak relative to the cathode potential. The same result, as far as the output signal is concerned, may be accomplished by shifting the zero axis of the input signal, as is done by the compensating tubes.

It should now be apparent that compensating tubes 58 and 59 must perform three functions. First, these tubes must increase the negative signal excursion in the second driver stage output so as to cut off the cathanode output tubes coupled thereto. Second, these tubes must cause the negative anode swing of the second driver stage to have sufficient magnitude and duration to average out with the undistorted positive anode signal swing and to impress a relatively constant average voltage on the coupling capacitors. Third, these tubes must adjust the zero axis of the signal fed to the cathanode stage in a direction to compensate for anode voltage sag.

Since the two halves of the amplifier, other than the phase-inverting unit 6, as shown in the preferred embodiment of Fig. 1, are symmetrical, and since compensating tube 58 acts in its half of the circuit in the same manner as does compensating tube 59 in the other half of the circuit, only operation of compensating tube 58 need be considered here.

First considering operation during amplification of a useful signal portion, assume there is a negative signal excursion tending to decrease current flow through tube 27 and lower the potential on cathode 32. At that instant there is a positive signal potential excursion on terminal A of coil 41. Thus the potential fed back to the junction of impedance 47 and impedance 54 from terminal A is moving in the positive direction, raising the potential on the cathode 32 of tube 27 and on the cathode 61 of compensating tube 58. The signal potential for compensating tube 58 is taken from the upper half of impedance 64. Since, at the instant in question, the voltage across the upper half of impedance 64 is increasing, due to the feedback from terminal A of coil 41, it is apparent that the resulting grid potential on tube 58 relative to its cathode is decreasing. In fact, during this portion of the signal cycle, the resultant negative excursion on the grid of the compensating tube 58 is sufficient to drive it to cut-off and effectively remove the tube from circuit operation.

The following half-cycle of the input signal is amplified in the lower half of the amplifier shown in Fig. 1. Even though the upper half of the amplifier is not producing useful output signal, output tube 35 being cut off, signal potential is impressed on grid 26 of driver tube 27. This positive signal excursion on grid 26 and the resulting current flow through tube 27 tends to increase the potential on cathode 32. Current flow through impedance 45 and the portion of impedance 47 above the variable tap connection to cathode 61 establishes a voltage drop across the anode-cathode path of the compensating tube. At this instant potential on terminal A of coil 41 is being driven negative relative to ground. The negative signal excursion on terminal A is regeneratively impressed on cathode 32, thereby lowering its potential relative to grid 26 and increasing current flow through tube 27.

In other words, the feedback from terminal A inrceases current flow through driver tube 27 and cathode impedances 45 and 47, thereby increasing the voltage drop across the anode-cathode path of tube 58. Also, the feedback voltage being negative relative to ground causes less and less current to flow through the upper portion of impedance 64, raising the potential of the variable tap connected to the grid of compensating tube 58 relative to the potential of cathode 61. The resulting positive signal excursion on the grid of the compensating tube 58 causes it to conduct, thereby effectively decreasing the cathode impedance of driver tube 27 and increasing the current flow in the anode-cathode circuit of this stage. As a result, the negative signal excursion on anode 30 of driver tube 27 is augmented, though distorted. It follows that by adjusting the drive and conduction threshold of the compensating tube it is possible to select a negative signal swing on anode 30 which will maintain a given constant average signal across coupling capacitor 33, and thus the correct A. C. axis on the signal fed to grid 34 of output tube 35.

It will be apparent that the variable tap on cathode impedance 47 acts to control the magnitude of the voltage impressed across the anode-cathode path of compensating tube 58 and a small portion of the grid drive of tube 58. It can also be seen that the voltage across the portion of impedance 47 which is below the variable tap is a threshold bias which is actually impressed between the grid and the cathode of the tube. However, the variable tap on the upper half of impedance 64 furnishes the primary grid drive control, and the closer this tap is moved toward ground the stronger the grid signal driving compensating tube 58 into conduction.

With regard to the third type of distortion considered, i. e., the output distortion caused by anode potential "sag," it has been seen that the solution to this problem in uncompensated circuits was to decrease the bias, moving the D. C. grid potential more positive. Thus, the positive peaks of the input signal were raised, by bias control, to the level required by the characteristic curve of the output tube under load conditions.

It has been brought out that compensating tubes 58 and 59 are also able to lift the positive peaks of the input signal by shifting the zero axis of the signal fed into the cathanode input. Since this action is the full equivalent to a change in the D. C. bias on these grids, it is possible to use the automatic action of the compensating tubes rather than a bias change. This is done by increasing the grid drive of the compensating tubes so as to slightly overcompensate relative to the compensation required in the absence of this third type of distortion. In addition to slightly overcompensating, it is also necessary to adjust the time constant of the cathanode input circuit so as to be substantially equal to the time constant of the anode power supply circuit. In view of the limitations imposed by the frequency of the audio signal to be amplified, it is usually necessary to balance time constants by adjusting or changing the time constant of the power supply. When the time constants of the cathanode input circuit and the anode potential supply are substantially the same, any shift in anode potential will be followed by a shift in the zero axis of the signal fed to the cathanode stage, and these shifts will occur at approximately the same rate because of the time constant similarity. Thus, compensating tubes 58 and 59 act to eliminate the third type of signal distortion caused by power supply regulation.

As has been pointed out, both the anode and cathode circuits of the second driver stage are regeneratively coupled to the output, thereby decreasing the signal drive requirements, size and cost of the tubes used in this stage. However, this strong regenerative stage would drive the amplifier into oscillation if it were not for the degenerative feedback voltage fed to the first driver stage.

The anode 25 of tube 16, for example, is coupled back to terminal A through impedances 50*a*, 50*b*, and 51, and when there is a positive signal excursion on grid 15, there is a positive signal excursion on terminal A. Thus, the contribution feed back from terminal A to anode 25 tends to oppose the signal on anode 25 resulting from the signal drive on grid 15. In other words, the feedback from terminal A is clearly in the degenerative sense.

With regard to the feedback in the cathodes of the first driver stage, the positive signal excursion on grid 15 increases the potential on cathode 19 by cathode follower action. This increase of cathode potential is in itself degenerative, since it tends to decrease anode current flow. Also, there is a positive signal excursion on terminal A at this instant, and the feedback through capacitor 42 and impedance 54 additionally tends to increase the potential of cathode 19, thereby further decreasing current flow in tube 16 and providing additional degeneration. The amount of this degenerative feedback is controlled by the impedance divider action of impedance 54 and impedance 21, along with the upper portion of impedance 23.

The variable tap on impedance 23 is used to balance the amplifier. As can be seen, it is necessary that both sides of the amplifier have the same over-all amplification, and since it is impossible to select absolutely symmetrical circuit components, a balance is maintained by the differential action on the input signal provided by the variable tap on impedance 23. Thus, by controlling the degenerative feedback so as to increase the drive of one side of the amplifier at the same time that the drive of the other side is being decreased, it is possible to maintain the desired and necessary balance between the two halves of the amplifier without absolute symmetry between components.

In describing circuit operation, emphasis has been placed upon the normal operating condition of the amplifier when amplifying strong signals. It has been assumed that only one output tube may be conducting at a given instant. This is not the complete story, because tubes 35 and 40 conduct slightly and at the same time under static conditions, i. e., in the absence of an input signal. They are both operated near but not at cut-off, and threshold bias controls 65 and 66 are provided to balance the idle or static D. C. anode current. In one embodiment, which has been constructed, both of these variable taps were differentially coupled to a single control knob. Thus, as the knob is rotated so as to increase bias on one of the output tubes, bias on the other output tube is decreased. It is apparent that a static balance between the two tubes can be easily brought about by using such a bias control in connection with ammeters or other anode-current-indicating devices in the anode circuits.

In addition to the feedback circuitry provided for the first and second driver stage, I also provide an over-all feedback path between the output of the cathanode stage and the input of the phase-inverting amplifier 6. As can be seen from the circuit of Fig. 1, only one feedback path is required. This is possible, due to the balanced action of the cathanode output stage. As has been explained, terminals A and B are coupled to the anode and cathode of each cathanode stage output tube, and thus the potential on both of these terminals is signal-driven during the half-cycle that tube 35 is conducting, and also during the half-cycle when tube 40 is conducting. Thus, a tap taken from terminal A to the input terminal of amplifier 6 always carries the correct polarity feedback voltage and corrects for the distortion introduced by both halves of the amplifier.

In other words, when tube 40 is cut off and and the top half of the amplifier is amplifying useful signals, the potential on terminal A is controlled by the potential on the cathode of tube 35. When this potential is fed back to the input of amplifier 6 it corrects for distortion in amplifiers 6, 16, 27 and 35. Symmetrically, when tube 35 is cut off and the lower half of the amplifier is amplifying useful signals, the signal excursion on terminal A is the result of signal current flow through the anode-cathode path of tube 40. During this portion of the cycle feedback from terminal A corrects for distortion in amplifiers 6, 18, 31 and 40. It is then apparent that the signal feedback path automatically acts to correct distortion in the half of the amplifier carrying useful signals.

While I do not desire to be limited to any specific circuit parameters, such parameters varying in accordance with individual circuit requirements, the following circuit values have been found entirely satisfactory in the illustrated embodiment of the invention:

| | | |
|---|---|---|
| Tubes: | | |
| 16 and 18 | | AB–150 |
| 27 and 31 | | 849A |
| 35 and 40 | | 9C28A |
| 58 and 59 | | AB–150 |
| Resistors: | | |
| 21 and 22 | ohms | 1,500 |
| 39 | do | 100,000 |
| 44 and 46 | do | 25,000 |
| 45 and 48 | do | 6,000 |
| 47 and 49 | do | 13,000 |
| 50*a* and 52*a* | do | 25,000 |
| 50*b* and 52*b* | do | 150,000 |
| 54 and 55 | do | 7,500 |
| 64 | do | 100,000 |
| Inductance: | | |
| 70 | henrys | 40 |
| 41 | do | 100 |
| Capacitors: | | |
| 24 | microfarads | 240 |
| 33 and 37 | do | 1.5 |
| 42 and 43 | do | 30 |
| Anode Potential | volts | 15,000 |
| Bias Potential | do | 4,000 |
| Potentiometers: | | |
| 23 | ohms | 125 |
| 65 and 66 | do | 80,000 |

While there has been shown and described what at present is considered a preferred embodiment of the present invention, it will become obvious to those skilled in the art that various changes and modifications may be made therein without departing from the invention as defined by the appended claims.

Having thus described my invention, I claim:

1. In an amplifier the combination comprising a pair of output terminals, an output tube having an anode coupled to one output terminal and a cathode coupled to the other output terminal, a second output tube having an anode coupled to said other output terminal and a cathode coupled to said one output terminal, a first and second driver stage for each output tube, each of said first driver tubes having an anode circuit degeneratively coupled to the output terminals and a cathode circuit degeneratively coupled to the output terminals, each of said second driver tubes having an anode circuit regeneratively coupled to the output terminals and a cathode circuit regeneratively coupled to the output terminals, a phase-inverting tube coupled to feed signals in opposite phase to the first stage driver tubes from a single-ended signal source and a single feedback path from one output terminal to the input of the phase-inverting stage.

2. In an amplifier the combination comprising a pair of output terminals, an output tube having an anode coupled to one output terminal and a cathode coupled to the other output terminal, a second output tube having an anode coupled to said other output terminal and a cathode coupled to said one output terminal, a first and second driver stage for each output tube, said first driver tubes each having an anode circuit degeneratively coupled to the output terminals and a cathode circuit degeneratively coupled to the output terminals, said second driver tubes each having an anode circuit regeneratively coupled to the output terminals and a cathode circuit regeneratively coupled to the output terminals, said first driver stage tubes being directly coupled to said second driver stage tubes and said second driver stage tubes being capacitively coupled to the output tubes, a phase-inverting tube coupled to feed signals in opposite phase to the first stage driver tubes from a single-ended signal source, and a single feedback path from one output terminal to the input of the phase-inverting stage.

3. In an amplifier the combination comprising a pair of output tubes, each having at least an anode, a cathode and a control grid, capacitor means coupling the anode of one tube to the cathode of the other tube, capacitor means coupling the anode of the other tube to the cathode of said one tube, center-tapped impedance means coupled between the cathodes of said tubes to form an output circuit, center-tapped impedance means coupled between the anodes of said tubes, a source of anode potential coupled between the center taps on said impedances, a first and second driver tube stage for each output tube, each of said first driver stage tubes having an anode circuit degeneratively coupled to the output and a cathode circuit degeneratively coupled to the output, and each of said second driver stage tubes having an anode circuit regeneratively coupled to the output and a cathode circuit regeneratively coupled to the output, a single-ended signal source, a phase-inverting amplifier coupled between said source and said first driver stage tubes, and a single feedback path coupled between said output and the input to the phase-inverting amplifier.

4. In an amplifier the combination comprising an output stage biased approximately at cutoff including an output impedance fed by an output tube having an anode, a cathode, and a control grid; a first and second driver tube, each driver tube having an anode, a cathode, and a control grid; means degeneratively coupling the anode and cathode of the first driver tube to said output impedance; means regeneratively coupling the anode and cathode of said second driver tube to the output impedance; means including a cathode impedance for biasing said second driver tube to pass negative signal half cycles and partially suppress positive signal half cycles; means capacitively coupling the anode of said second driver tube and the control grid of said output tube; means coupling the anode of said first driver tube and the grid of said second driver tube; a grid-controlled compensating tube having an anode-cathode path tapped across a portion of the second driver tube cathode impedance; a source of input signals coupled to the grid of the first driver tube; and means responsive to said signals to augment the second driver tube output signal excursion by supplying a positive signal excursion on the grid of said compensating tube during the period when said driver tube would otherwise suppress positive input signal peaks.

5. In an amplifier, the combination of a push-pull output stage comprising a pair of Class B-operated output tubes each having an input circuit, a driver stage comprising a pair of driver tubes each having a cathode impedance and at least an anode, a cathode, and a control electrode, individual capacitor means coupling the anode circuits of said driver tubes to the input circuits of said output tubes, a source of push-pull signals coupled to the control electrode circuits of said driver tubes, means biasing said driver tube control electrodes to pass negative half cycles of the input signals linearly and partially to suppress peaks of the positive half cycles of the input signals, a pair of compensating tubes having their anodes individually connected to the cathodes of said driver tubes and their cathodes tapped to the cathode impedances of said driver tubes, control electrodes for said compensating tubes, and means responsive to said signals for supplying positive signal excursions on the control electrodes of said compensating tubes, having sufficient duration, during the period when said driver tubes would otherwise suppress positive input signal peaks, to augment the driver tube output negative signal excursions, said means comprising regenerative feedback connections from the output stage to said cathode impedances and connections from said cathode impedances to the control electrodes of said compensating tubes.

6. In an amplifier, the combination of a push-pull output stage comprising a pair of Class B-operated output tubes each having an input circuit, a driver stage comprising a pair of driver tubes each having a cathode impedance and at least an anode, a cathode, and a control electrode, individual capacitor means coupling the anode circuits of said driver tubes to the input circuits of said output tubes, a source of push-pull signals coupled to the control electrode circuits of said driver tubes, means biasing said driver tube control electrodes to pass negative half cycles of the input signals linearly and partially to suppress peaks of the positive half cycles of the input signals, a pair of compensating tubes having their anodes individually connected to the cathodes of said driver tubes and their cathodes tapped to the cathode impedances of said driver tubes, control electrodes for said compensating tubes, and means responsive to said signals for supplying positive signal excursions on the control electrodes of said compensating tubes, having sufficient duration, during the period when said driver tubes would otherwise suppress positive input signal peaks, to augment the driver tube output negative signal excursions, said means comprising regenerative feedback connections from the output stage to said cathode impedances and a pair of potentiometers connected in series between said feedback connections, said potentiometers having individual variable taps connected to the control electrodes of said compensating tubes.

7. In an amplifier the combination comprising a pair of output tubes, each having at least an anode, a cathode and a control grid, capacitor means coupling the anode of one tube to the cathode of the other tube, capacitor means coupling the anode of the other tube to the cathode of said one tube, center-tapped impedance means coupled between the cathodes of said tubes to form an output circuit, center-tapped impedance means coupled between the anodes of said tubes, a source of anode potential coupled between the center taps on said impedances, a first and second driver tube stage for each output tube, each of said first driver stage tubes having an anode circuit degeneratively coupled to the output and a cathode circuit degeneratively coupled to the output, and each of said second driver stage tubes having an anode circuit regeneratively coupled to the output and a cathode circuit regeneratively coupled to the output, a source of push-pull signals coupled to the first driver tube stages, and feedback means coupled between the output of the amplifier and the source of push-pull signals.

References Cited in the file of this patent

UNITED STATES PATENTS

| | | |
|---|---|---|
| 2,069,809 | Armstrong | Feb. 9, 1937 |
| 2,468,082 | Chatterjea et al. | Apr. 26, 1949 |
| 2,581,953 | Hecht et al. | June 8, 1952 |
| 2,648,727 | Rockwell | Aug. 11, 1953 |
| 2,662,938 | Goldstine | Dec. 15, 1953 |

FOREIGN PATENTS

| | | |
|---|---|---|
| 540,834 | Great Britain | Oct. 31, 1941 |
| 892,851 | France | May 3, 1944 |